UNITED STATES PATENT OFFICE.

EDWIN L. SIMPSON, OF BRIDGEPORT, CONNECTICUT, ASSIGNOR TO SIMON STEVENS, OF NEW YORK, N. Y.

IMPROVEMENT IN THE MANUFACTURE OF HARD RUBBER.

Specification forming part of Letters Patent No. 46,609, dated February 28, 1865.

*To all whom it may concern:*

Be it known that I, EDWIN L. SIMPSON, of Bridgeport, in the county of Fairfield and State of Connecticut, have invented a new and useful Improvement in the Manufacture of India-Rubber, commonly called "Hard Rubber;" and I do hereby declare the following to be a full, clear, and exact description of the same.

My invention relates to the preparation of india-rubber for the manufacture of combs, jewelry, and all articles now manufactured or which may be from hard rubber; and it consists in the employment of my improved compound, for which I have applied for Letters Patent, in such proportion that after being subjected to the required heat or curing the rubber will become very hard and capable of receiving a beautiful polish.

To enable others skilled in the art to prepare my hard rubber and manufacture articles therefrom, I will proceed to fully describe my method of so doing. I will first describe the improved compound as set forth in the specification accompanying my application for patent for the same, before referred to.

To facilitate the preparation of the compound I first boil linseed or other similar vegetable oil to about the consistency of honey; then to each quart of oil so boiled add about one pound of sulphur, carefully subjecting them to a moderate heat, sufficient only to cause the two substances to react upon each other until they pass from a fluid or semi-fluid to an elastic doughy substance. This forms my improved compound, in the preparation of which all the odor or apparent presence of sulphur is entirely removed, and when combined with india-rubber and subjected to a sufficient regulated heat will cause the same to undergo a change and produce a manufacture entirely free from the disagreeable odor and other deleterious effects of sulphur in vulcanized rubber, but adapted to all the uses thereof.

To produce my hard rubber, to one (1) pound of india-rubber add ten (10) ounces of my above-described compound. The more of the compound the harder will the rubber be. This proportion I believe to be right for most purposes. These I thoroughly combine by grinding between warm rolls, and when so combined the substance will be in a plastic state, and may then be molded into any required form or cured in lump, if preferred. After being thus molded or in lump, place in a chamber, to which steam is admitted to heat the said chamber to about 320° Fahrenheit, there to remain for from four to five hours—less time as the heat is higher. Remove from the heat, and after being allowed to cool may be polished in the usual manner for hard rubber.

Owing to the absence of the deleterious effects and disagreeable odor always attending the ordinary vulcanized rubber, my hard rubber is applicable to many more uses than the other.

Having therefore fully described my invention, what I claim as new and useful, and desire to secure by Letters Patent, is—

The compound produced by combining the within-described compound with india-rubber, and the said compound cured in the manner and for the purpose herein set forth.

EDWIN L. SIMPSON.

Witnesses:
H. M. WELCH,
JOHN E. EARL.